May 11, 1937.　　D. A. MURPHY　　2,080,225
SWIVEL
Filed Aug. 24, 1936　　4 Sheets-Sheet 1

INVENTOR.
Demery A. Murphy
BY Lyon & Lyon
ATTORNEYS

May 11, 1937.  D. A. MURPHY  2,080,225
SWIVEL
Filed Aug. 24, 1936   4 Sheets-Sheet 2

INVENTOR.
Demery A. Murphy
BY Lyon & Lyon
ATTORNEYS

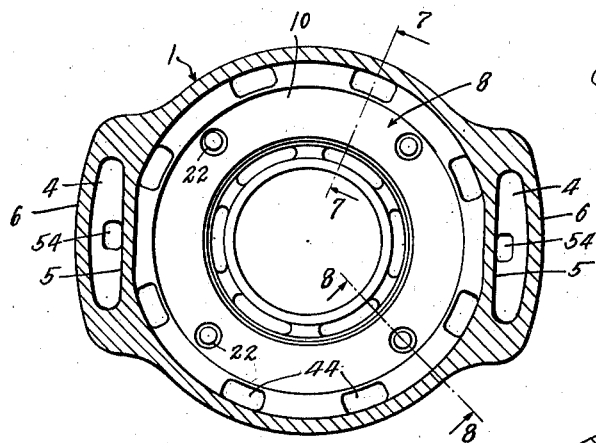
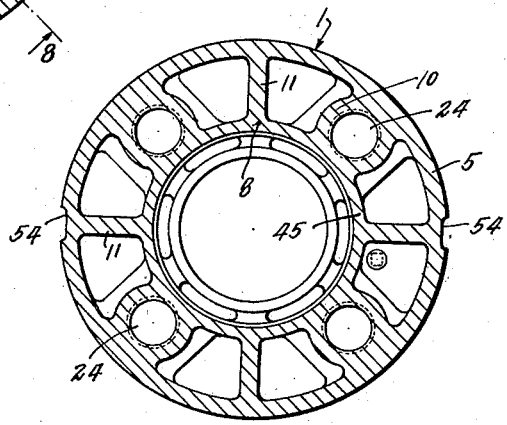
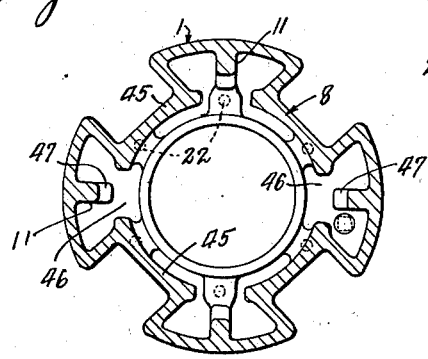

May 11, 1937.                 D. A. MURPHY                    2,080,225
                                SWIVEL
                        Filed Aug. 24, 1936            4 Sheets-Sheet 4
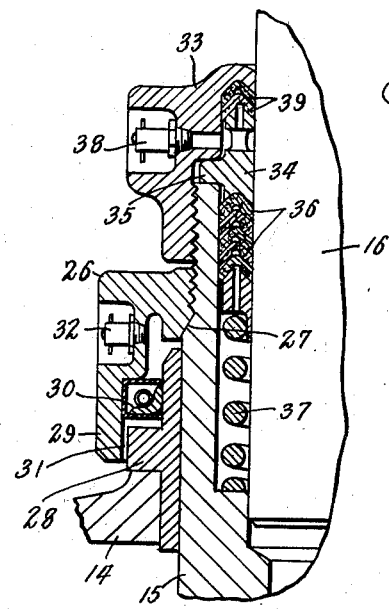
Fig. 9.
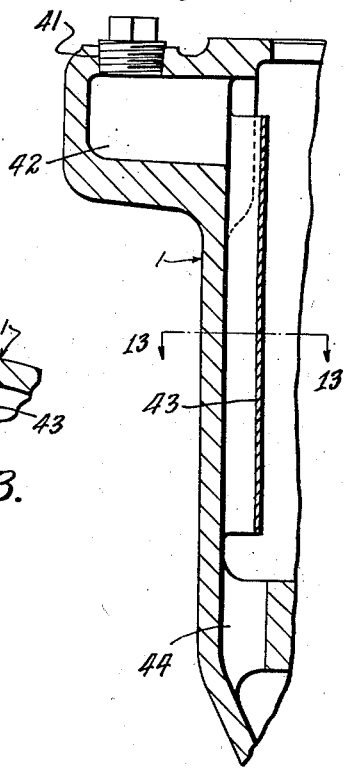
Fig. 12.
Fig. 13.
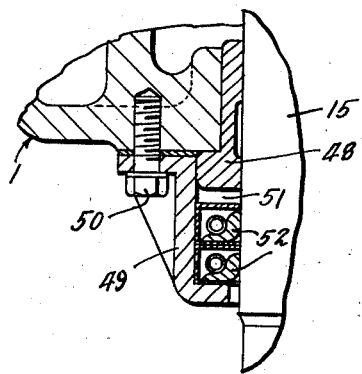
Fig. 10.
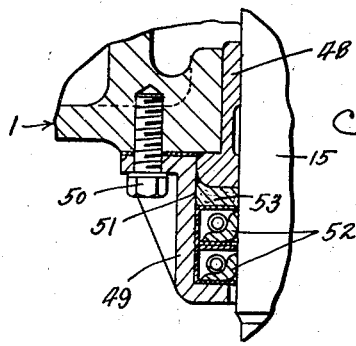
Fig. 11.
INVENTOR.
Demery A. Murphy
BY Lyon & Lyon
ATTORNEYS

Patented May 11, 1937

2,080,225

UNITED STATES PATENT OFFICE 2,080,225

SWIVEL

Demery A. Murphy, Torrance, Calif., assignor, by mesne assignments, to The National Supply Company of Delaware, Toledo, Ohio, a corporation of Delaware Application August 24, 1936, Serial No. 97,548

16 Claims. (Cl. 255—25)

This invention relates to rotary swivels and more particularly to rotary swivels as employed in connection with the rotary process of drilling oil, gas, water, or other wells.

This invention is directed to an improvement in that form of rotary swivel as illustrated in the patent to John D. Spalding, No. 2,031,337, granted February 18, 1936.

An object of this invention is to provide a rotary swivel having an improved form of wash pipe packing.

Another object of this invention is to provide a rotary swivel in which the body is formed to provide an oil chamber and in which rotary swivel there is provided an improved form of oil seal closure for the wash pipe and rotary stem at the upper end of the body of the swivel.

Another object of this invention is to provide a rotary swivel having an improved form of body construction, the body of which swivel is so designed and constructed as to permit of effective treatment of the mechanical problems of design while at the same time giving to the swivel a pleasing and ornamental appearance.

Other objects and advantages of this invention it is believed will be apparent from the following detailed description of a preferred embodiment thereof as illustrated in the accompanying drawings.

In the drawings:

Figure 4 is a sectional end view taken substantially on the line 4—4 of Figure 3.

Figure 5 is a sectional end view taken substantially on the line 5—5 of Figure 3.

Figure 6 is a sectional end view taken substantially on the line 6—6 of Figure 3.

Figure 9 is an enlarged fragmentary sectional view of the oil seal means provided at the upper end of the swivel embodying my invention.

Figure 10 is an enlarged fragmental sectional view of the oil seal provided at the lower end of the swivel embodying my invention.

Figure 11 is an enlarged fragmental sectional view of the modified form of oil seal means as illustrated in Figure 10.

Figure 12 is an enlarged fragmental sectional elevation of the oil filling means embodying my invention.

Figure 13 is a sectional elevation taken substantially on the line 13—13 of Figure 12.

Figure 1:
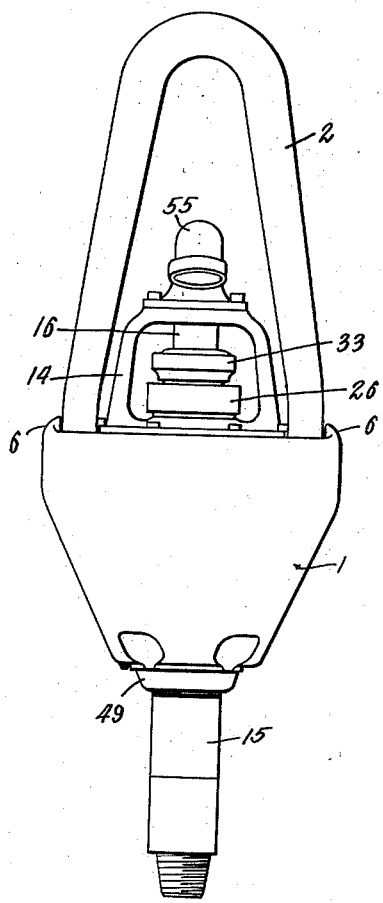
Figure 1 is a front elevation of a rotary swivel embodying my invention.
Figure 2:
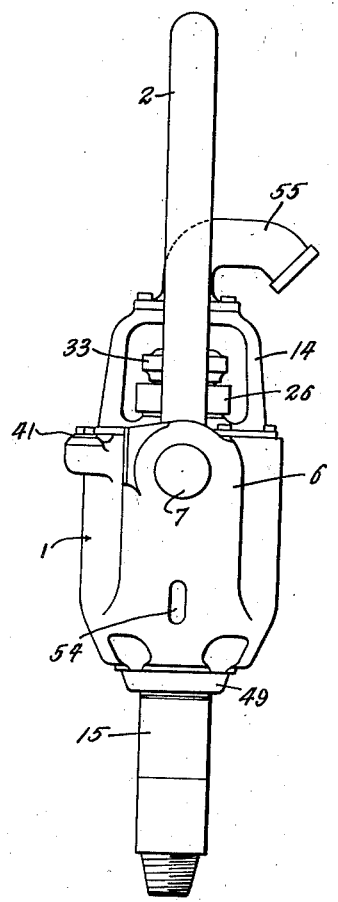
Figure 2 is a side elevation thereof.
Figure 3:
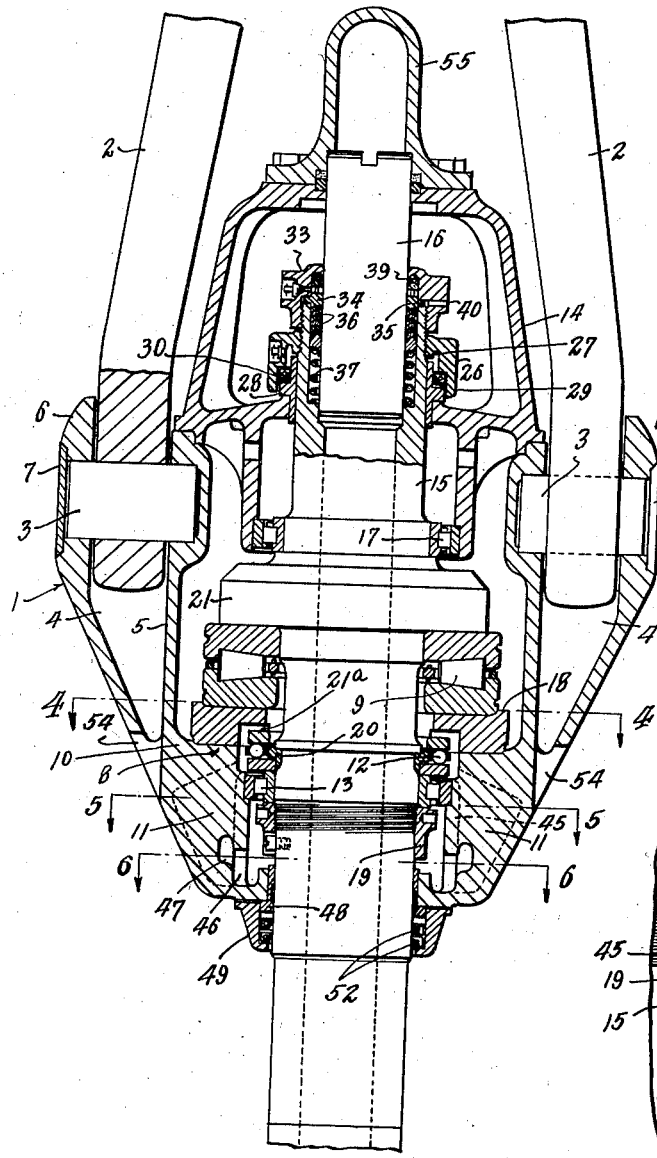
Figure 3 is an enlarged front elevation mainly in vertical mid-section thereof.

In the preferred embodiment of my invention illustrated in the accompanying drawings, 1 indicates a body or bowl of the swivel which is so designed as to present a pleasing or ornamental appearance. Connected with the body 1 is a swivel bail 2 which is secured to the body or bowl 1 by trunnions 3 mounted within pockets 4 formed in the bowl 1 between the body wall 5 and the bail wall 6. The trunnions 3 are maintained in position by means of plates 7 secured over the opening formed in the bail wall 6 by any suitable or desirable means.

The bowl 1 of the swivel is at its lower end formed to provide a main platform or ribbed pier 8 for supporting the main bearing 9. The ribbed pier 8 is formed of a supporting platform 10 and the integrally formed ribs 11 are cast inwardly from the outer wall of the swivel. The entire load transmitted to the bails 2 that is imposed upon the swivel is transmitted directly to the bails 2 from below the main bearing 9 through the integrally formed walls 5 and 6 of the body 1. The wall 5 of the bowl 1 is formed to enclose the bearing 9, the up-thrust bearing 12 and the radial bearing 13. At its upper end the bowl 1 is provided with a closure cap 14. Rotatably supported on the main bearing 9 is a rotary stem 15 which projects upwardly through the body 1 and cap 14 to be connected with the wash-pipe 16 in a manner which will be hereinafter particularly pointed out. The cap 14 carries the outer race of the radial bearing 17 for the rotary stem 15. The main bearing anchor plate 18 is supported on the platform or main bearing supporting pier 8.

The entire thrust bearing assembly for the rotary stem 15 is supported within the body 1 as a unit, permitting the entire thrust bearing assembly to be withdrawn from the body 1 with the rotary stem.

Secured to the rotary stem is a collar 19 which is threaded to the rotary stem 15 so as to permit of adjustment of the bearing assembly. Positioned between the rotary stem 15 and the body 1 immediately above the collar 19 is the radial bearing 13. Supported on the inner race ring of the radial bearing 13 is the upthrust bearing assembly 12, the lower race plate of which is positioned below the annular shoulder 20 of the rotary stem 15, the upper race plate of which is supported within the annular recess 21ª formed in the anchor plate 18 of the main bearing 9. A thrust shoulder 21 of the rotary stem 15 is supported by the main supporting bearing 9.

In order to secure the assembly of bearings and rotary stem 15 in position within the body 1, securing studs 22 are passed through the bowl 1 upwardly and threaded into the anchor plate 18. The nuts 23 and the studs 22 are positioned within, and concealed within, pockets 24 formed in the body 1 near the lower end and the pockets 24 are closed by plugs 25.

In order to provide an oil sealed structure and to prevent the admission of rotary mud or other foreign matter into the interior of the bowl 1, a bonnet 26 is threaded to the rotary stem 15 near the upper end thereof. The bonnet 26 and stem 15 are formed to provide complementary tapered shoulders 27 to form a fluid seal to prevent the admission of foreign matter or the leakage of oil through the threaded connection.

A bushing 28 is pressed into the bore of the cap 14. The bonnet 26 has a downwardly extending annular skirt 29 which overlaps a portion of the bushing 28. Pressed into the recess defined between the skirt 29 of the bonnet 26 and the bushing 28 is an oil seal ring 30. In this construction any foreign matter tending to pass into the interior of the rotary swivel by the fluid tight connection must pass upwardly against the influence of gravity through the opening 31 between the skirt 29 and the bushing 28. With this type of seal it will thus be observed that the tendency of all foreign matter is to fall away from the point of admission through the seal. A grease fitting 32 is provided in the bonnet 26 for the purpose of lubricating the sealing ring 30 and the contacting surfaces of the rotary stem 15 and the bushing 28.

The washpipe 16 is connected in fluid-tight relation to the rotary stem 15 by means of a bonnet 33 which is threaded to the upper end of the rotary stem 15. Between the upper surface of the stem 15 and the bonnet 33 is a lantern ring 34. An annular flange 35 of the lantern ring 34 is clamped between the bonnet 33 and the upper end of the stem 15. A plurality of oil seal rings 36 are positioned below the lantern ring and are normally held under pressure by means of a spring 37. A grease fitting 38 is provided in the bonnet 33 in position to deliver lubricant above the lantern ring 34 but below the oil seal rings 39 carried in the bonnet 33. Lubricant forced through the connection 38 passes downwardly along the inner periphery of the lantern ring 34 to the oil seal rings 36. With this structure a hydrostatic pressure applied against the seal rings 36 is transmitted through the flange 35 to the bonnet 33. There is therefore no pressure applied against the upper seal rings 39 and their sole function is to prevent the leakage of lubricant at the time lubricant is fed through the connection 38.

Formed in the bonnet 33 is a vent hole 40 opposite the flange 35. The vent hole is provided to inform the operator of any leakage which may result from the failure of the seal rings 36. Leakage would have to result from the fluid cutting through the joint between the flange 35 and the stem 15 or the bonnet 33. If it were not for the provision of a vent 40, the fluid thus escaping would erode or cut out the threaded connections between the stem 15 and the bonnet 33 before it became known to the operator that leakage was occurring. The provision of the vent hole 40 permits the operator to be warned of the leakage before this damage has occurred.

In order to provide for the lubrication of the bearing structure within the swivel, the body 1 is provided with a lubricant opening 41 through which lubricant is admitted into the bowl 1. Lubricant admitted through the opening 41 drops into a recess 42. Secured to the wall of the body 1 is a guide pipe 43. The upper end of the guide pipe 43 extends above the lower level of the recess 42. The lower end of the guide pipe 43 extends within the body to a position below the main bearing 9. With this construction the lubricant admitted into the body of the swivel is delivered into the body below the main bearing so that any sediment or foreign matter introduced into the swivel with the oil will have an opportunity to settle to the bottom of the bowl 1 before the lubricant contacts the main bearing.

Figure 7:
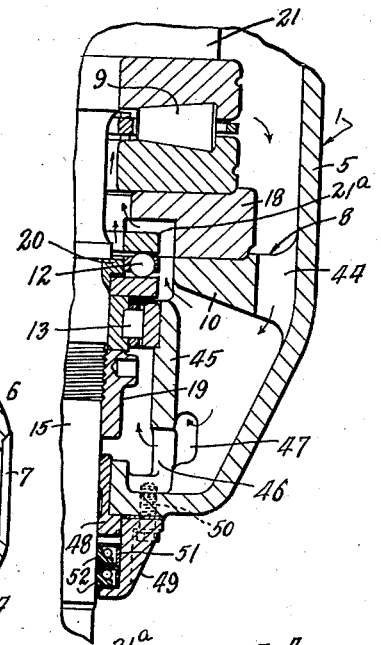
Figure 7 is a fragmental sectional elevation taken substantially on the line 7—7 of Figure 4.
Figure 8:
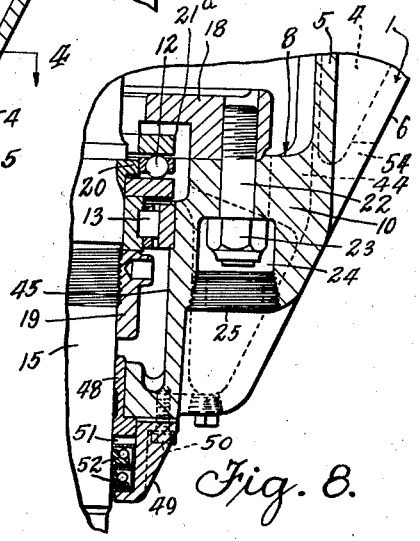
Figure 8 is a fragmental sectional elevation taken substantially on the line 8—8 of Figure 4.

The lubricant within the bowl or body 1 is circulated therein to the bearings as follows:

Formed through the supporting platform 10 are a plurality of circulation openings 44. In the rotation of the stem 15 the action of the main bearing 9 causes the lubricant to circulate substantially as indicated by the arrows in Figure 7. The oil within the bowl or body 1 is circulated by the main bearing 9 down through the openings 44 into the chamber provided between the ribs 11 of the pier 8. A portion of the lubricant also passes through the openings 46 of the inner wall 45 and 47 of the ribs 11 for the radial bearing 13. The lubricant is also circulated to the upthrust bearing 12 from the lubricant well formed below the anchor plate 18. In order to avoid the constriction of the lubricant between the ribs 11, the openings 47 are provided through the ribs 11, permitting communication of the oil.

At the lower end of the body 1 a bushing 48 is press-fitted into position. A cap 49 is secured to the lower end of the body 1 by means of bolts 50 and the cap 49 is provided with a recess 51 to receive oil seal rings 52 to seal the structure to the rotary stem 15.

As will be apparent from Figure 11, the failure of the oil seal rings 52 may be remedied if or when such failure occurs by the inserting of an ordinary packing ring 53 above the oil seal rings 52 upon removal of the cap 49.

In order to permit the draining of any foreign matter, rotary mud or the like which may find its way into the recess 4 in which the bails 2 are situated, openings 54 are provided at the lower ends of the recesses 4 in the wall of the body 1.

The entire structure of the body 1 of the swivel is of what might be termed a basket construction so formed as to properly distribute the internal stresses in the various sections of the body. The goose-neck connection provided for connecting the goose-neck 55 of the swivel with the washpipe 16 may be of any suitable or desirable construction and may be as illustrated in the patent to John D. Spalding, No. 2,031,337, heretofore referred to.

Having fully described my invention, it is to be understood that I do not wish to be limited to the details herein set forth, but my invention is of the full scope of the appended claims.

I claim:

1. In a rotary swivel, the combination of a rotary stem having a packing recess at one end, a non-rotatable washpipe concentrically mounted for a portion of its length within said packing recess, a cap member detachably secured to said stem, a lantern ring clamped between opposing faces of said stem and cap member, said lantern and cap defining a separate packing recess about said washpipe, packing within said recess, packing within the stem packing recess to form a fluid-tight rotary connection with the washpipe, and means to convey lubricant through the cap and lantern ring to lubricate the latter packing.

2. In a rotary swivel, the combination of a rotary member comprising a stem and a cap, said member having a packing recess at one end, a non-rotatable washpipe concentrically mounted partially within the packing recess, a pair of spaced packing elements within the recess and encircling the washpipe, said elements being composed of V-type packing rings, a ring fixed upon the rotary member in fluid-tight relation and positioned between the elements, the ring having an inlet passageway for lubricant, said packing rings being oriented in the same direction whereby lubricant from said ring may pass by only one of said packing elements.

3. In a rotary swivel, the combination of a rotary stem having a packing recess at its upper end, a non-rotatable washpipe concentrically mounted partially within the packing recess, a cap member detachably secured to the stem, a ring clamped between opposing faces of the stem and cap member, said cap member being provided with an inlet passageway for lubricant, packing means within the recess below the ring forming a fluid-tight rotary connection with the washpipe, said cap having a packing recess about the washpipe, auxiliary packing means within the cap recess to prevent escape of lubricant introduced through said passageway.

4. In a rotary swivel, the combination of a rotary member comprising a stem and a cap, said member having a packing recess at its upper end, a non-rotatable washpipe concentrically mounted partially within the packing recess, a pair of spaced packing elements within the recess and encircling the washpipe, the elements each forming a fluid-tight rotary connection between the washpipe and the rotary member and adapted to prevent leakage upwardly along the washpipe, a ring removably fixed upon the rotary member and positioned between the packing elements whereby pressure imparted to the lower element is transmitted through the ring directly to the rotary member without being imparted to the upper element.

5. In a rotary swivel, the combination of a rotary member comprising a stem and a cap, said member having a packing recess at its upper end, a non-rotatable washpipe concentrically mounted partially within said packing recess, a pair of spaced packing elements within the recess and encircling the washpipe, said elements each forming a fluid-tight rotary connection between the washpipe and the rotary member and adapted to prevent leakage upwardly along the washpipe, a lantern ring removably fixed in fluid-tight relation upon the rotary member and positioned between the packing elements and having an inlet fluid passageway communicating with the outside surface of the wash pipe.

6. In a rotary swivel, the combination of a rotary stem having a packing recess at one end, a non-rotatable washpipe concentrically mounted partially within the packing recess, a cap member detachably secured to the stem, a lantern ring fixed upon the stem in fluid-tight relation, said cap having a packing recess about the washpipe, packing within the cap recess, packing within the stem packing recess to form a fluid-tight rotary connection with the washpipe, and means to convey lubricant through the lantern ring to lubricate the latter packing.

7. In a rotary swivel, a washpipe packing assembly including a rotary member, a stationary member, one of the members encircling the other and defining between them an annular recess for packing, a pair of spaced packing elements within the recess and encircling the inner member, the elements being composed of V-type packing rings, a lantern ring fixed in fluid-tight relation with the outer member and positioned between the elements, the lantern ring having an inlet passageway for lubricant, said packing rings being oriented in the same direction whereby lubricant from the lantern ring may pass by only one of the packing elements.

8. In a rotary swivel, a washpipe packing assembly including a rotary member, a stationary member, one of the members encircling the other and defining between them an annular recess for packing, a pair of spaced packing elements within the recess, the elements each forming a fluid-tight rotary connection with the inner member and adapted to prevent leakage upwardly along its outer surface, a lantern ring fixed in fluid-tight relation upon the outer member and positioned between the packing elements whereby pressure imparted to the lower element is transmitted through the lantern ring directly to the outer member without being imparted to the upper element.

9. In a rotary swivel, the combination of a housing, a stem rotatably mounted within said housing, means cooperating with the stem and housing to form a seal at one end thereof; said means including a stepped annular extension on the housing encircling the stem, said stepped extension having a small diameter portion and a large diameter portion, a cap member adapted to rotate with the stem and having a skirt encircling the large diameter portion and fitting closely therewith, said small diameter portion and skirt being formed to define an annular packing recess, and packing means within said recess.

10. In a rotary swivel, the combination of a housing, a stem rotatably mounted within the housing, means cooperating with the stem and housing to form a seal at one end thereof, said means including an inner member associated with the housing, an outer member associated with the stem and overlapping a portion of the inner member, said members defining between them an annular recess, and a seal ring within the recess and carried by the outer member, said seal ring engaging said inner member to form a seal.

11. In a rotary swivel, the combination of a housing, a stem rotatably mounted within the housing, means cooperating with the stem and housing to form a seal at one end thereof, said means including an upwardly extending tubular member on the housing encircling the stem, a cap member threaded to the stem and fitting fluid-tight therewith, said cap member having a depending skirt encircling the tubular member, the tubular member and skirt being formed to define an annular packing recess, and a seal ring within the recess and carried by the cap member, said seal ring engaging the tubular member to form a seal.

12. In a rotary swivel of the type used in the drilling of wells, a supporting housing, a stem rotatably mounted in the housing and provided with a tapered seat, a cap member threadedly connected to the stem and provided with a corresponding tapered portion adapted to engage the seat in fluid-tight relation, an upwardly projecting tubular member on the housing and encircling the stem, said cap member having a downwardly extending skirt encircling the tubular member and defining between the members an annular recess, and a seal ring carried by said cap member and positioned within the recess, the seal ring engaging the tubular member to form a seal.

13. In a rotary swivel the combination of a body, a main supporting bearing within the body above the lower end thereof, a rotary stem supported within the body by said bearing, closure means for the body to form within the body a lubricant chamber within which lubricant is retained, a lubricant filling opening in the body above the normal level of lubricant therein, and a lubricant conducting member within the body for conducting the lubricant from the filling opening to a point below the normal level of lubricant therein.

14. In a rotary swivel the combination of a body, providing near its lower end a webbed pier, an anchor plate positioned upon said pier, a main bearing supported upon the anchor plate, a rotary stem supported within the body by said bearing, bolts extending from the lower end and through the body for releasably securing the anchor plate within the body, said bolts having their heads within pockets formed upwardly from the lower end of the body, and plugs threaded into position to close the said pockets when the bolts are in position.

15. In a rotary swivel the combination of a body, the body being formed at its lower end to provide therein a webbed supporting pier, a main bearing supported on the pier, radial and upthrust bearings below the main bearing, a rotary stem within the body supported and positioned by said bearings, the body being formed to provide a lubricant well therein extending below the pier, and the pier structure below the main bearing being formed with openings to permit the lubricant within the lubricant well to be circulated to said bearings.

16. In a rotary swivel, the combination of a body, a supporting shelf defining within said body an upper chamber and a lower chamber, an opening formed between said chambers adjacent the outer wall of said body, a main bearing in the upper chamber, a stem rotatably supported on said bearing, means defining a passage between the lower chamber and the inner portion of said main bearing, radial and upthrust bearing means for said stem below said passage, said main bearing upon rotation being adapted to cause a circulation of lubricant between said chambers, the path of said circulation being downwardly through said opening and upwardly through said passage.

DEMERY A. MURPHY.